US009684866B1

(12) United States Patent
Todd, Jr. et al.

(10) Patent No.: US 9,684,866 B1
(45) Date of Patent: Jun. 20, 2017

(54) DATA ANALYTICS COMPUTING RESOURCE PROVISIONING BASED ON COMPUTED COST AND TIME PARAMETERS FOR PROPOSED COMPUTING RESOURCE CONFIGURATIONS

(71) Applicant: EMC Corporation, Hopkinton, MA (US)

(72) Inventors: Stephen Todd, Jr., Shrewsbury, MA (US); Rhonda Baldwin, Campbell, CA (US); David Dietrich, Hopedale, MA (US); Wayne A. Pauley, Jr., Hudson, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 607 days.

(21) Appl. No.: 13/923,791

(22) Filed: Jun. 21, 2013

(51) Int. Cl.
*G06N 5/02* (2006.01)
*G06Q 10/06* (2012.01)

(52) U.S. Cl.
CPC ............. *G06N 5/02* (2013.01); *G06Q 10/067* (2013.01)

(58) Field of Classification Search
None
See application file for complete search history.

(56) References Cited

U.S. PATENT DOCUMENTS

| 8,548,954 | B2 | 10/2013 | Cina |
| 8,700,678 | B1 | 4/2014 | Fan et al. |
| 9,098,617 | B1 | 8/2015 | Pauley, Jr. et al. |
| 9,098,803 | B1 | 8/2015 | Todd et al. |
| 9,262,493 | B1 | 2/2016 | Dietrich |
| 9,329,909 | B1* | 5/2016 | Khanna ................. G06F 9/5072 |
| 2002/0198889 | A1 | 12/2002 | Vishnubhotla |
| 2004/0128287 | A1 | 7/2004 | Keller et al. |
| 2007/0143290 | A1* | 6/2007 | Fujimoto ............... G06Q 30/02 |

(Continued)

OTHER PUBLICATIONS

Herodotou et al. Starfish: A Selftuning System for Big Data Analytics. 5th Biennial Conference on Innovative Data Systems Research (CIDR '11) Jan. 9-12, 2011, Asilomar, California, USA. pp. 261-272.*

(Continued)

*Primary Examiner* — Stanley K Hill
*Assistant Examiner* — Robert Bejcek, II
(74) *Attorney, Agent, or Firm* — Ryan, Mason & Lewis, LLP

(57) ABSTRACT

A work package is obtained defining a data analytic plan for analyzing a given data set associated with a given data problem. The work package is generated in accordance with an automated data analytics lifecycle. The data analytic plan and the given data set are analyzed. Based on at least a portion of results of the analysis, at least one of a cost parameter and a time parameter is computed for one or more computing resource configurations proposed for implementing the data analytic plan. One of the one or more computing resource configurations is selected based on at least one of the cost parameter and the time parameter. A computing resource infrastructure is caused to be provisioned in accordance with the selected computing resource configuration. The above steps are performed on one or more processing elements associated with a computing system.

20 Claims, 5 Drawing Sheets

(56) References Cited

U.S. PATENT DOCUMENTS

| | | |
|---|---|---|
| 2008/0294583 A1 | 11/2008 | Hunt et al. |
| 2010/0017870 A1 | 1/2010 | Kargupta |
| 2010/0088284 A1 | 4/2010 | Cina |
| 2011/0066589 A1 | 3/2011 | Chang et al. |
| 2011/0145392 A1 | 6/2011 | Dawson et al. |
| 2011/0251874 A1 | 10/2011 | Banthia et al. |
| 2012/0054182 A1 | 3/2012 | Gupta et al. |
| 2012/0089980 A1 | 4/2012 | Sharp et al. |
| 2012/0131591 A1 | 5/2012 | Moorthi et al. |
| 2012/0158633 A1 | 6/2012 | Eder |
| 2012/0185851 A1 | 7/2012 | Zhang et al. |
| 2012/0215582 A1 | 8/2012 | Petri et al. |
| 2012/0233315 A1 | 9/2012 | Hoffman et al. |
| 2012/0271949 A1 | 10/2012 | Radhakrishnan et al. |
| 2012/0330869 A1 | 12/2012 | Durham |
| 2013/0091170 A1 | 4/2013 | Zhang et al. |
| 2013/0139152 A1 | 5/2013 | Chang et al. |
| 2013/0173569 A1 | 7/2013 | Pearcy |
| 2013/0326538 A1 | 12/2013 | Gupta et al. |
| 2014/0115610 A1 | 4/2014 | Marinelli, III et al. |
| 2014/0330744 A1 | 11/2014 | Hampapur et al. |
| 2014/0330745 A1 | 11/2014 | Hampapur et al. |

OTHER PUBLICATIONS

Zhang et al. Sedic: Privacy-Aware Data Intensive Computing on Hybrid Clouds. CCS'11, Oct. 17-21, 2011, Chicago, Illinois, USA. pp. 515-525.*

Kambatla et al. Towards Optimizing Hadoop Provisioning in the Cloud. Proceeding HotCloud'09 Proceedings of the 2009 conference on Hot topics in cloud computing Article No. 22. pp. 1-5.*

Simitsis et al. HFMS: Managing the Lifecycle and Complexity of Hybrid Analytic Data Flows. IEEE 29th International Conference on Data Engineering (ICDE) 2013, Apr. 8, 2013 (Apr. 8, 2013), pp. 1174-1185.*

Tian et al. Towards Optimal Resource Provisioning for Running MapReduce Programs in Public Clouds. 2011 IEEE 4th International Conference on Cloud Computing. pp. 155-162. 2011.*

Babu, Shivnath. Towards Automatic Optimization of MapReduce Programs. SoCC'10, Jun. 10-11, 2010, Indianapolis, Indiana, USA. 2010.*

Sandholm et al. MapReduce Optimization Using Regulated Dynamic Prioritization. SIGMETRICS/Performance'09, Jun. 15-19, 2009.*

Sandholm et al. Dynamic Proportional Share Scheduling in Hadoop. E. Frachtenberg and U. Schwiegelshohn (Eds.): JSSPP 2010, LNCS 6253, pp. 110-131, 2010.*

P. Mell et al., "The NIST Definition of Cloud Computing," U.S. Department of Commerce, Computer Security Division, National Institute of Standards and Technology, Special Publication 800-145, Sep. 2011, 7 pages.

U.S. Appl. No. 13/628,589, filed in the name of Wayne A. Pauley, Jr. et al. on Sep. 27, 2012 and entitled "Data Analytics Lifecycle Automation."

P.K. Gunda et al., "Nectar: Automatic Management of Data and Computation in Datacenters," Proceedings of the 9th Symposium on Operating Systems Design and Implementation (OSDI), Oct. 2010, 14 pages.

T. Nykiel et al., "MRShare: Sharing Across Multiple Queries in MapReduce," Proceedings of the VLDB Endowment, 2010, 12 pages, vol. 3, No. 1.

H. Herodotou et al., "MapReduce Programming and Cost-based Optimization? Crossing this Chasm with Starfish," Proceedings of the VLDB Endowment, 2011, 4 pages, vol. 4, No. 12.

G. Lee et al., "Heterogeneity-Aware Resource Allocation and Scheduling in the Cloud," Proceedings of the USENIX Conference on Hot Topics in Cloud Computing, 2011, pp. 1-5.

P. Russom, "Big Data Analytics," TDWI Best Practices Report, Fourth Quarter, tdwi.org, 2011, 4 pages.

R.G. Sargent, "Verification and Validation of Simulation Models," Proceedings of the 2005 Winter Simulation Conference, 2005, pp. 130-143.

I.H. Witten et al., "Data Mining: Practical Machine Learning Tools and Techniques," 2011, 664 pages, 3d ed., Morgan Kaufmann Publishers, United States.

L. Proctor et al., "Analytical Pathway Methodology: Simplifying Business Intelligence Consulting," 2011 Annual SRII Global Conference, IEEE 2011, pp. 495-500.

S. Amjad et al., "Automating Scholarly Article Data Collection with Action Science Explorer," 2014 International Conference on Open Source Systems and Technologies (ICOSST), 2014 IEEE, pp. 160-169.

G. Alatorre et al., "Intelligent Information Lifecycle Management in Virtualized Storage Environments," 2014 SRII Global Conference, 2014 IEEE, pp. 9-18.

G. Cai et al., "Semantic Data Fusion Through Visually-enabled Analytical Reasoning," 2014 17th International Conference, 2014 IEEE, pp. 1-7.

\* cited by examiner

DATA ANALYTICS COMPUTING RESOURCE PROVISIONING BASED ON COMPUTED COST AND TIME PARAMETERS FOR PROPOSED COMPUTING RESOURCE CONFIGURATIONS

FIELD

The field relates to data analytics, and more particularly to techniques for provisioning computing resources for use in data analytics.

BACKGROUND

Data analytics typically refers to the science that incorporates various disciplines including, but not limited to, data engineering, mathematics, statistics, computing, and domain-specific expertise. A data scientist thus is one who practices some or all aspects of data analytics in attempting to solve complex data problems.

Conventional data analytics solutions are becoming more and more limited due to the increasing sizes and variety of data sets that such solutions are applied against. Such limitations include the lack of ability to adequately calculate the cost of the data analytics solution, including costs associated with computing resources and time consumption. Also, significant inefficiencies can occur when the data analytics solution has to repeat processes on the same set of data.

Accordingly, improved data analytics techniques are needed that enable business users and data scientists to execute data analytics more easily and efficiently.

SUMMARY

Embodiments of the invention provide techniques for provisioning computing resources for use in data analytics.

In one embodiment, a method comprises the following steps. A work package is obtained defining a data analytic plan for analyzing a given data set associated with a given data problem. The work package is generated in accordance with an automated data analytics lifecycle. The data analytic plan and the given data set are analyzed. Based on at least a portion of results of the analysis, at least one of a cost parameter and a time parameter is computed for one or more computing resource configurations proposed for implementing the data analytic plan. One of the one or more computing resource configurations is selected based on at least one of the cost parameter and the time parameter. A computing resource infrastructure is caused to be provisioned in accordance with the selected computing resource configuration. The above steps are performed on one or more processing elements associated with a computing system.

In another embodiment, a computer program product is provided which comprises a processor-readable storage medium having encoded therein executable code of one or more software programs. The one or more software programs when executed by one or more processing elements of a computing system implement steps of the above-described method.

In yet another embodiment, an apparatus comprises a memory and a processor operatively coupled to the memory and configured to perform steps of the above-described method.

Advantageously, illustrative embodiments described herein provide provisioning techniques for use with data analytics solutions that substantially improve ease of use and efficiency by automatically considering time and cost for various proposed computing resource configurations, as well as automatically incorporating security and/or privacy policies into the various proposed computing resource configurations.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Further, as used herein, the term "provisioning" refers to the process(es) of generating and/or deploying one or more computing resources in a computing system, such as for example, in a cloud infrastructure environment, generating and deploying one or more virtual machines and logical storage units in a data center.

It is to be appreciated that prior to a detailed description of computing resource provisioning techniques according to embodiments of the invention, we will first describe, in Section I, an exemplary data analytics lifecycle automation and provisioning system in which, and/or with which, the computing resource techniques can be implemented. Illustrative computing resource provisioning techniques will then be described below in Section II. However, it is to be further appreciated that the computing resource provisioning techniques may be alternatively implemented in a stand-alone system or in any other data analytics system in which it would be desirable to improve ease of use and efficiency of the system.

I. Exemplary Data Analytics Lifecycle Automation and Provisioning System

FIGS. 1A through 4 will be used to describe the exemplary data analytics lifecycle automation and provisioning system. Further details of this exemplary system can be found in the U.S. patent application identified as Ser. No. 13/628,589, filed on Sep. 27, 2012, and entitled "Data Analytics Lifecycle Automation," the disclosure of which is incorporated by reference herein in its entirety.

Figure 1A:
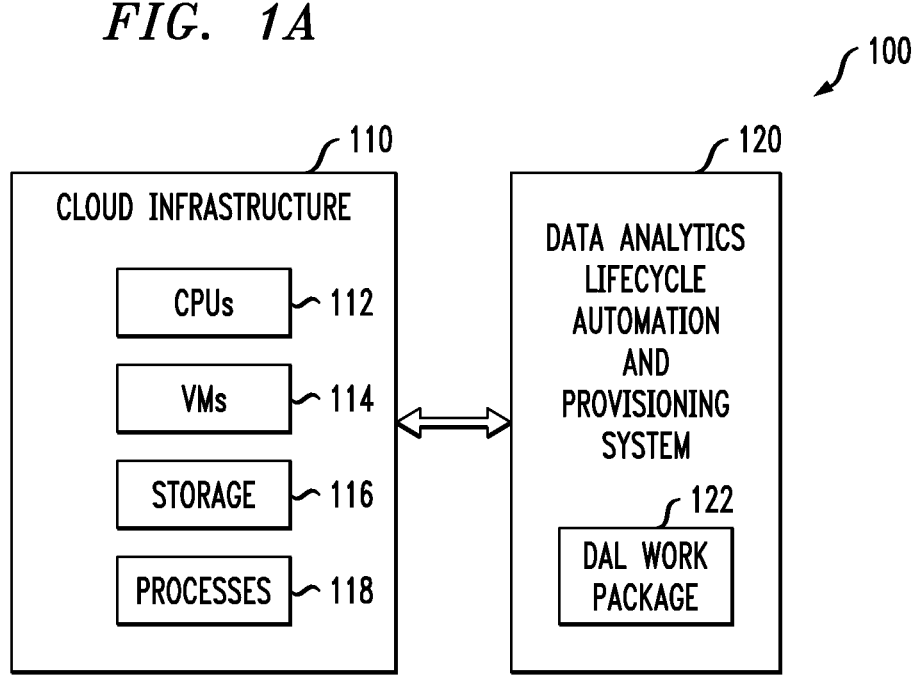
FIG. 1A illustrates cloud infrastructure and a data analytics lifecycle automation and provisioning system, in accordance with one embodiment of the invention.

FIG. 1A shows a system 100 configured in accordance with an illustrative embodiment of the present invention. The system 100 comprises cloud infrastructure 110 and a data analytics lifecycle automation and provisioning system 120.

As will be explained in detail below, the data analytics lifecycle automation and provisioning system 120 enables a data scientist to automatically, yet still interactively, create a work package 122 that can be executed to solve one or more complex data problems. By "work package" it is meant a specific set of instructions that are used for analysis, preparation, and/or support of steps within a data analytic lifecycle (e.g., a data analytic plan) for solving the one or more complex data problems. System 120 accomplishes this, as will be explained in detail below, by providing processing elements that embody phases of a data analytics lifecycle (DAL) including, but not limited to, discovery, data preparation, model planning, model building, and operationalization of results.

Cloud infrastructure 110 is illustratively depicted in the figure as comprising an execution environment with execution components comprising one or more central processing units (CPUs) 112, one or more VMs 114, and storage devices 116 (upon which logical units (LUNs) are implemented) that execute one or more processes 118 that operate on one or more process input data sets that generate one or more process output data sets. Thus, the work package generated by system 120 can be operationalized using execution components (both physical and virtual computing resources) in the cloud infrastructure 110. A computing resource provisioning system and methodologies used to provision such execution components in the cloud infrastructure 110 will be described below in the context of FIG. 5.

Although system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the data analytics lifecycle automation and provisioning system 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

Figure 1B:
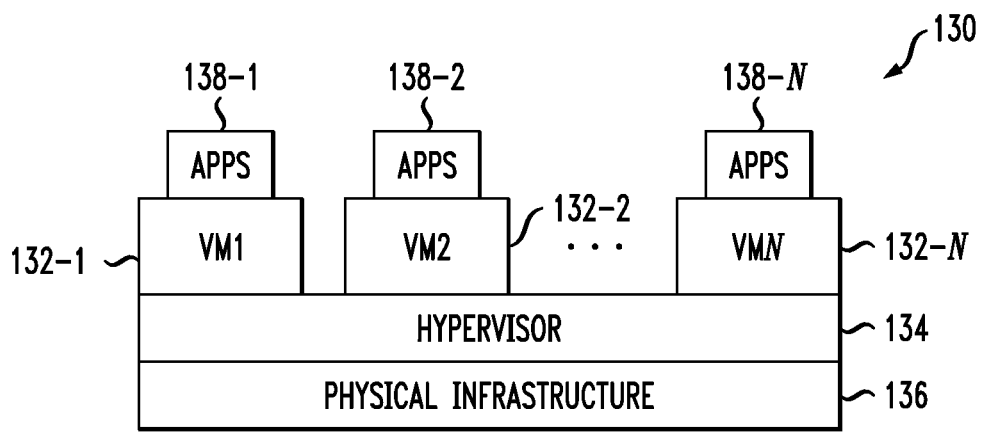
FIG. 1B illustrates a more detailed view of the cloud infrastructure of FIG. 1A.

As shown in FIG. 1B, the cloud infrastructure 130 (corresponding to 110 in FIG. 1A) comprises virtual machines (VMs) 132-1, 132-2, . . . 132-N implemented using a hypervisor 134. The hypervisor 134 is an example of what is more generally referred to herein as "virtualization infrastructure." The hypervisor 134 runs on physical infrastructure 136 (e.g., such as may include CPUs 112 and/or storage devices 116 in FIG. 1A). The cloud infrastructure 130 further comprises sets of applications 138-1, 138-2, . . . 138-N running on respective ones of the virtual machines 132-1, 132-2, . . . 132-N (utilizing associated LUNs or virtual disks) under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

An example of a commercially available hypervisor platform that may be used to implement portions of the cloud infrastructure 130 (110) in one or more embodiments of the invention is the VMware® vSphere™ which may have an associated virtual infrastructure management system such as the VMware® vCenter™. The underlying physical infrastructure 136 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 130 (110).

Figure 2:
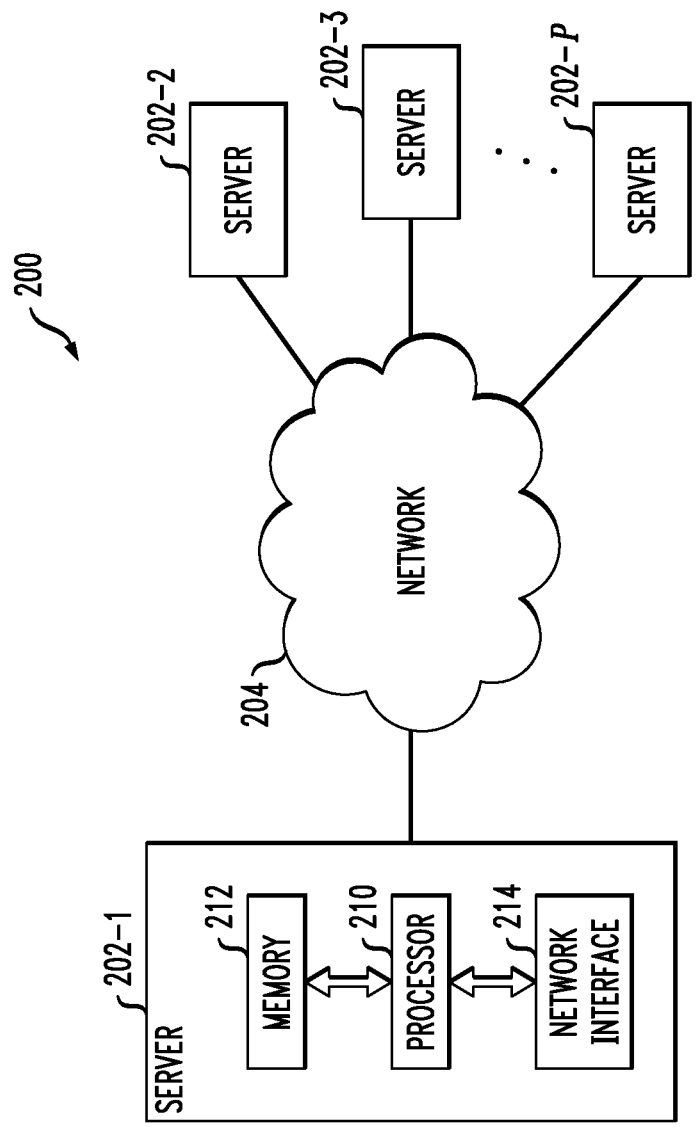
FIG. 2 illustrates a processing platform on which the cloud infrastructure and the data analytics lifecycle automation and provisioning system of FIG. 1A are implemented, in accordance with one or more embodiments of the invention.

An example of a processing platform on which the cloud infrastructure 110 and/or the data analytics lifecycle automation and provisioning system 120 of FIG. 1A may be implemented is processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 200 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Illustrative details of the data analytics lifecycle automation and provisioning system 120 will now be described with reference to FIGS. 3 and 4.

It is to be understood that the spectrum of complex data problem types that the data analytics lifecycle automation and provisioning system can be used to address is far reaching. By way of example only, the data scientist (as well as other actors in a data analytics lifecycle) is typically faced with the task of designing a data processing system that handles data associated with tasks such as, for example, a complex research project, a data mining project involving a very large amount of data (so-called "big data"), one or more applications that a customer entity wishes to be hosted by a service provider entity (e.g., in a data center environment), a business problem, etc. The common problem that a database administrator, a data engineer, or a data scientist faces with each of these complex data problem types is how to design and provision the computing environment (platform) that will be used for analysis and what data sets to include in the analysis. Part of the problem is also identifying the size and compute power needed for the analytic "sandbox," as will be described below, in which the data scientist will work and experiment with the data.

Figure 3:
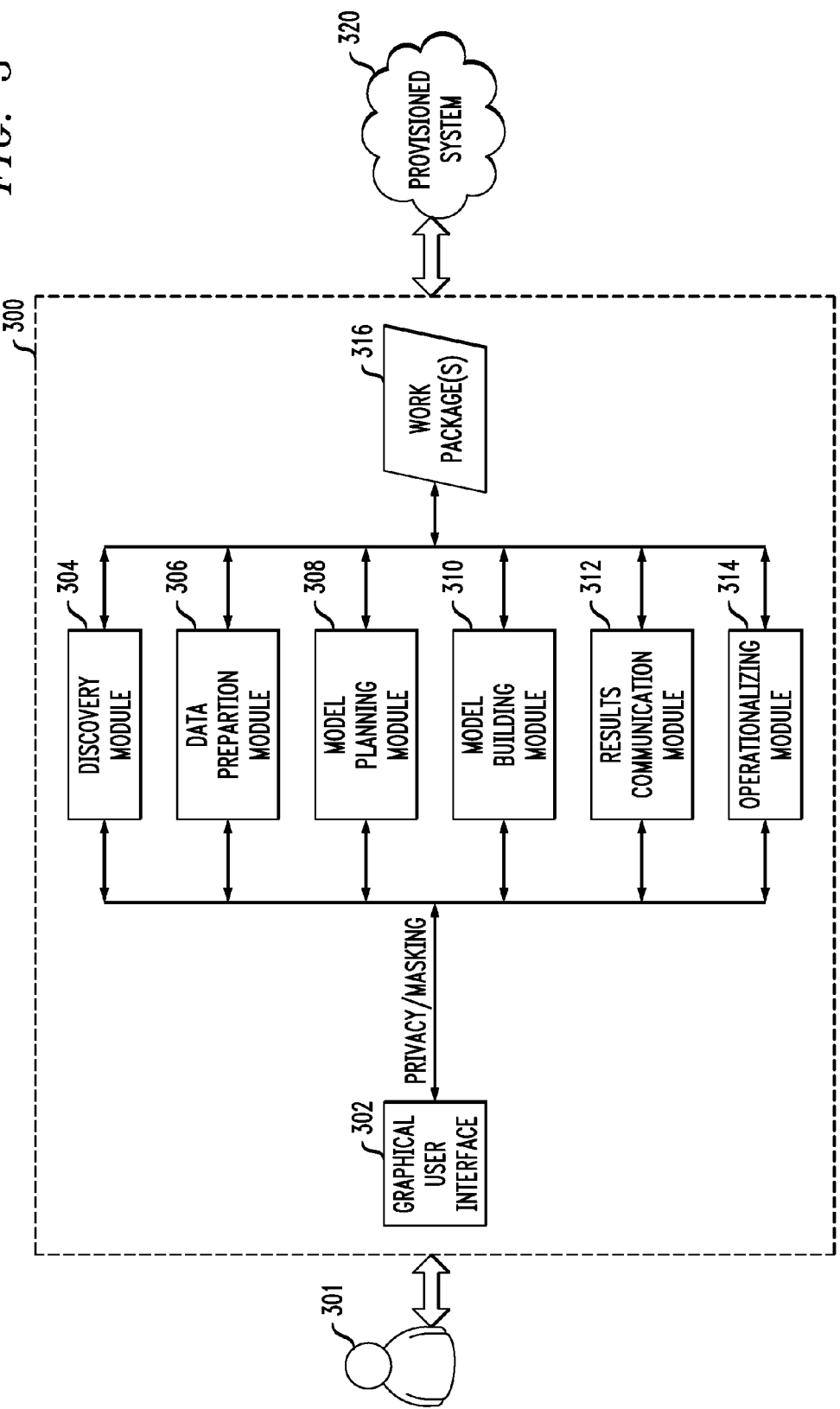
FIG. 3 illustrates a data analytics lifecycle automation and provisioning system, in accordance with one embodiment of the invention.
Figure 4:
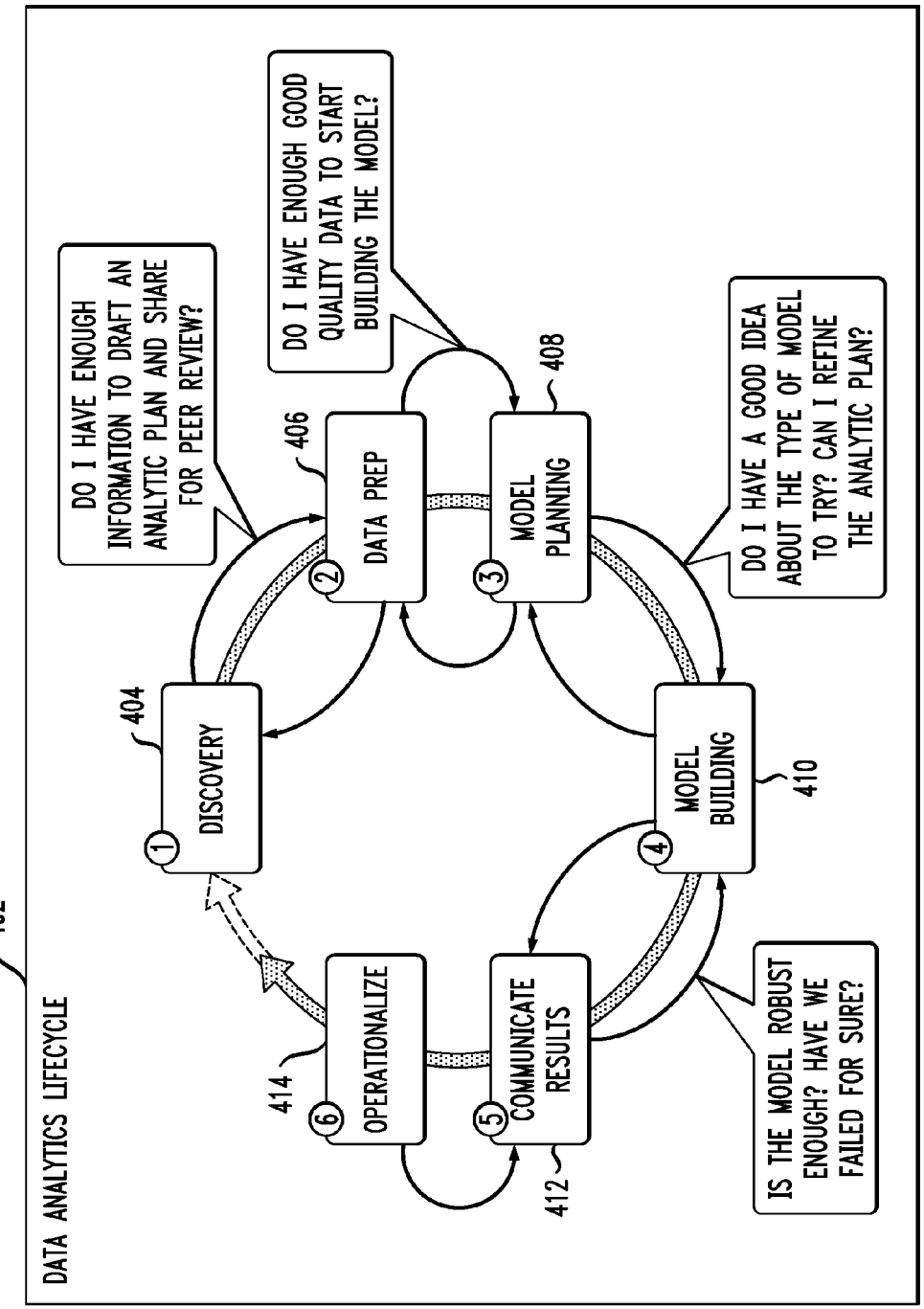
FIG. 4 illustrates a data analytics lifecycle automation and provisioning methodology, in accordance with one embodiment of the invention.

FIG. 3 illustrates a system for assisting the data scientist, inter alia, to overcome the problems mentioned above. More particularly, FIG. 3 depicts a data analytics lifecycle automation and provisioning system 300 (e.g., corresponding to system 120 of FIG. 1) that allows a data scientist 301 (or some other user or users, e.g., business user) to design and generate a provisioned system 320 that can be used to analyze and otherwise process data associated with a given complex data problem.

As shown, system 300 includes a graphical user interface 302, a discovery module 304, a data preparation module 306, a model planning module 308, a model building module 310, a results communication module 312, an operationalizing module 314, and one or more work packages 316. Note that the components of system 300 in FIG. 3 may be implemented on a single computing system, or one or more components of system 300 may be implemented in a distributed computing system, e.g., across multiple servers 202 in FIG. 2.

The graphical user interface (GUI) 302 is the interface(s) through which the data scientist 301 interacts (e.g., enters data, responses, queries to one or more modules, and receives data, results, and other output generated by one or more modules) with system 300. It is to be understood that the interface used to interact with system 300 does not necessarily have to be a graphical user interface, but rather could be through command lines or some other form of input/output. As such, embodiments of the invention are not limited to any particular form of user interface.

Note that the six modules of the system 300 respectively correspond to the phases of a data analytics lifecycle (DAL). FIG. 4 depicts the six phases of a DAL 402, according to one embodiment of the invention, including: a discovery phase 404, a data preparation phase 406, a model planning phase 408, a model building phase 410, a results communication phase 412, and an operationalizing phase 414. Each component of the system 300 assists the data scientist 301 in generating work package 316 that is used to provision the actual analytics system (provisioned system 320) that addresses the given complex data problem.

A description of each DAL phase will now be given with an exemplary problem for which the system 320 is being designed and provisioned. In this example, the problem is a business problem. More specifically, and by way of example only, the business problem is assumed to be the task of accelerating innovation in a global technology corporation. Three aspects of this problem may be: (a) the tracking of knowledge growth throughout the global employee base of the corporation; (b) ensuring that this knowledge is effectively transferred within the corporation; and (c) effectively converting this knowledge into corporate assets. Developing an analytics system (320 in FIG. 3) that executes on these three aspects more effectively should accelerate innovation, which will thus improve the viability of the corporation. Thus, the task of system 300 is to develop such an analytics system. Of course, it is to be understood that this corporate innovation acceleration problem is just one of a myriad of examples of complex data problems that system 300 using DAL 402 can be used to address.

Discovery Phase 404 (Performed by Module 304 in System 300).

In the discovery phase, the data scientist develops an initial analytic plan. The analytic plan lays the foundation for all of the work in the analytic project being developed to address the business problem. That is, the analytic plan assists the data scientist 301 in identifying the business problem, a set of hypotheses, the data set, and a preliminary plan for the creation of algorithms that can prove or disprove the hypotheses. By way of example only, in the corporate innovation acceleration problem mentioned above, one hypothesis identified by the user as part of the analytic plan may be that an increase in geographic knowledge transfer in a global corporation improves the speed of idea delivery. This hypothesis paves the way for what data will be needed and what type of analytic methods will likely need to be used.

Data Preparation Phase 406 (Performed by Module 306 in System 300).

As the arrows in DAL 402 indicate, the six phases are iterative and interrelated/interconnected, and as such, one phase can be returned to from one of the other phases in the process. Also, proceeding to the second phase (406) is often a matter of whether or not the data scientist is ready and comfortable sharing the analytic plan developed in the first phase (404) with his/her peers (this comfort level is reflective of the maturity of the analytic plan—if it is too rough and unformed, it will not be ready to be shared for peer review). If so, then the data preparation phase 406 can begin. That is, once the analytic plan has been delivered and socialized, the next step focuses on the data. In particular, the next step is about conditioning the data. The data must be in an acceptable shape, structure, and quality to enable the subsequent analysis.

Continuing with the corporate innovation acceleration example, assume that the type of data that the analytics project relies on falls into two categories: (i) an "idea submission" data set (essentially a large-scale database containing structured data); and (ii) a globally-distributed set of unstructured documents representing knowledge expansion within the corporation in the form of minutes and notes about innovation/research activities. It is realized that these data sets cannot be analyzed in their raw formats. In addition, it is possible that the data is not of sufficient quality. Furthermore, the data is likely inconsistent.

All of these issues suggest that a separate analytic "sandbox" must be created to run experiments on the data. The "sandbox" here refers to a separate analytics environment used to condition and experiment with the data. This sandbox is realized via data preparation module 306. On average the size of this sandbox should be roughly ten times the size of the data in question. As such, the sandbox preferably has: (i) large bandwidth and sufficient network connections; (ii) a sufficient amount of data including, but not limited to, summary data, structured/unstructured, raw data feeds, call logs, web logs, etc.; and (iii) transformations needed to assess data quality and derive statistically useful measures. Regarding transformations, it is preferred that module 306 transform the data after it is obtained, i.e., ELT (Extract, Load, Transform), as opposed to ETL (Extract, Transform, Load). However, the transformation paradigm can be ETLT (Extract, Transform, Load, Transform again), in order to attempt to encapsulate both approaches of ELT and ETL. In either the ELT or ETLT case, this allows analysts to choose to transform the data (to obtain conditioned data) or use the data in its raw form (the original data). Examples of transformation tools that can be available as part of data preparation module 306 include, but are not limited to, Hadoop™ (Apache Software Foundation) for analysis, Alpine Miner™ (Alpine Data Labs) for creating analytic workflows, and R transformations for many general purpose data transformations. Of course, a variety of other tools may be part of module 306.

It is further realized that once the sandbox is created, there are three key activities that allow a data scientist to conclude whether or not the data set(s) he/she is using is sufficient:

(i) Familiarization with the data. The data scientist 301 lists out all the data sources and determines whether key data is available or more information is needed. This can be done by referring back to the analytic plan developed in phase 404 to determine if one has what is needed, or if more data must be loaded into the sandbox.

(ii) Perform data conditioning. Clean and nonnalize the data. During this process, the data scientist 301 also discerns what to keep versus what to discard.

(iii) Survey and visualize the data. The data scientist 301 can create overviews, zoom and filter, get details, and begin to create descriptive statistics and evaluate data quality.

Model Planning Phase 408 (Performed by Module 308 in System 300).

Model planning represents the conversion of the business problem into a data definition and a potential analytic approach. A model contains the initial ideas on how to frame the business problem as an analytic challenge that can be solved quantitatively. There is a strong link between the hypotheses made in phase 404 (discovery phase) and the analytic techniques that will eventually be chosen. Model selection (part of the planning phase) can require iteration and overlap with phase 406 (data preparation). Multiple types of models are applicable to the same business problem. Selection of methods can also vary depending on the experience of the data scientist. In other cases, model selection is more strongly dictated by the problem set.

Described below are a few exemplary algorithms and approaches (but not an exhaustive list) that may be considered by the data scientist 301 in the exemplary accelerated corporate innovation hypothesis given above:

(i) Use Map/Reduce for extracting knowledge from unstructured documents. At the highest level, Map/Reduce imposes a structure on unstructured information by transforming the content into a series of key/value pairs. Map/Reduce can also be used to establish relationships between innovators/researchers discussing the knowledge.

(ii) Natural language processing (NLP) can extract "features" from documents, such as strategic research themes, and can store them into vectors.

(iii) After vectorization, several other techniques could be used:

(a) Clustering (e.g., k-means clustering) can find clusters within the data (e.g., create 'k' types of themes from a set of documents).

(b) Classification can be used to place documents into different categories (e.g., university visits, idea submission, internal design meeting).

(c) Regression analysis can focus on the relationship between an outcome and its input variables, and answers the question of what happens when an independent variable changes. Regression analysis can help in predicting outcomes. This could suggest where to apply resources for a given set of ideas.

(d) Graph theory (e.g., social network analysis) is a way to establish relationships between employees who are submitting ideas and/or collaborating on research.

At this point in the DAL 402, the data scientist 301 has generated some hypotheses, described potential data sets, and chosen some potential models for proving or disproving the hypotheses.

Model Building Phase 410 (Performed by Module 310 in System 300).

In the model building phase, the system experimentally runs the one or more models that the data scientist 301 selected in phase 408. The model(s) may be executed on a portion of the original (raw) data, a portion of the conditioned data (transformed in phase 406), or some combination thereof. In this phase, the initial data analytic plan is updated to form a refined data analytic plan.

For example, Map/Reduce algorithm, NLP, clustering, classification, regression analysis and/or graph theory models are executed by module 310 on a test sample of the data identified and conditioned by module 306 in phase 406 (data preparation). Here the data scientist 301 is able to determine whether the models he/she selected are robust enough (which depends on the specific domain of the data problem being addressed) and whether he/she should return to the model planning phase 408. For example, in the corporate innovation acceleration example, some portion of the data sets identified in the earlier phases (e.g., structured idea submissions and unstructured support documents) is processed with the selected models.

Results Communication Phase 412 (Performed by Module 312 in System 300).

In the results communication phase, the results of the model execution of phase 410 are reported to the data scientist 301 (via GUI 302). This phase is also where the analytic plan that was initially developed in phase 404 and fine-tuned through phases 406, 408 and 410 can be output by the system 300 (i.e., as a refined or final analytic plan). The final analytic plan at this point in the DAL 402 may be referred to as a work package (316 in FIG. 3).

Operationalizing Phase 414 (Performed by Module 314 in System 300).

Operationalizing refers to the process of actually provisioning computing resources (physical and/or virtualized) to generate the system that will be deployed to handle the analytics project in accordance with the final analytic plan, e.g., system 320 in FIG. 3. This may involve provisioning VMs and LUNs as well as other virtual and physical assets that are part of cloud infrastructure 110 in FIG. 1. The provisioned system will then analyze subsequent data that is obtained for the given complex data problem.

As will be described below in Section II, the operationalizing module 314 can operate in conjunction with a computing resource provisioning system to be described below in the context of FIG. 5. In an alternative embodiment, such a computing resource provisioning system may be implemented as part of the operationalizing module 314. However, as will be further explained below in the context of FIG. 5, such a computing resource provisioning system is configured to operate in conjunction with one or more of the other modules (302 through 312) of the system 300.

Given the detailed description of the data analytics lifecycle phases above, we now make some observations and introduce some other features and advantages of the system.

Assume that the data scientist 301 is at a later phase in the process but then realizes that he/she forgot to include some data in the discovery phase 404 that is needed to complete the analysis. Advantageously, the interrelated and iterative nature of DAL 402 and the flexibility of the system used to automate the DAL (system 300) provide the data scientist with the ability to return to the discovery phase, correct the error, and return to a subsequent stage with the results for each stage affected by the change being automatically updated.

During the model building phase 410, it is not known what resources are going to be needed, which have a specific cost, and definition of what would be included (amount of storage, number of VMs, the analytics tools needed, etc.). Being able to know the approximate cost and configuration needed would be very useful for the process of tuning the model based on cost or configuration constraints. Thus, during each phase of the DAL 402, the data scientist 301 is presented (at GUI 301) with an inventory of the current infrastructure, services, and tools needed and their approximate cost as changes are made to the parameters associated with the analysis. This will be further described below in the context of FIG. 5. This allows the data scientist to remove or change the model dynamically based on resource constraints (e.g., cost or VM limits).

Once the analytics work package 316 is defined, provisioning the resources needed to most efficiently support the analysis is important. As such, embodiments of the invention automate and execute work packages for the data scientist by constructing the work package and providing resource and cost estimates throughout the DAL.

Many times, introducing new raw, source data sets into a project can have cascading effects on the size of the analytic sandbox (see data preparation phase 406 above) needed to support the analysis. Embodiments of the invention provide selectable sizing multiples to dynamically provision the system parameters, such as a storage capacity, bandwidth required, and compute power depending on the type of new data involved and its size. For example, these sizing multiples could be used between phases 404 and 406, between 406 and 408, and even between phase 408 and 410. The sizing multiples serve as a mechanism for dynamically provisioning and adjusting the size, capacity, and constraints needed for the analytic sandbox.

By way of example only, assume there is 100 GB worth of innovation data that is to be analyzed. The data preparation module 306 multiplies this value by some constant (e.g., 10 or 20 times) in order to estimate the capacity of the analytic sandbox. That is, the data scientist will take the 100 GB of data and run transformations and other experiments that will require additional amounts of capacity. Therefore, the data preparation module 306 creates a work package specification that states: "allocate 1 TB of sandbox data which has the following features . . . " This aspect of the work package instructs cloud provisioning software to allocate appropriately.

It is also realized that privacy of data is a major concern when mining large amounts or correlating various types of data. Privacy of the individuals needs to be protected while still allowing useful analysis and presentation of the data. Embodiments of the invention provide for masking capabilities in the work package 316, as well as any data presented by the system, for the data scientist, as well as creating contextual views based on the identity of the consumer of the output. This feature is very useful, particularly in a highly regulated data environment.

Further, the privacy/masking techniques associated with the work package 316 and other data can be employed to protect the data from wholesale viewing by the data scientist or an output generated by the work package execution. Also it is possible to create multiple views of the data based on privacy constraints tied to the context and role of the potential viewer. For example, a mid-level sales manager may have the ability to see consolidated data across the sales areas in the country, but his/her subordinates within the same area would only be allowed to see that specific area's data view as they are not authorized to see data across the country for regulatory (e.g., Security and Exchange Commission) reasons.

As a consequence of the privacy aspect, the data scientist can receive a diagnostic summary stating the resources they have access to for the analytical work they are planning to pursue.

While some illustrative privacy/masking techniques have been described above, it is to be understood that alternative privacy protection controls (such as, but not limited to, privacy anonymization) can be employed in system 300.

In addition, the operationalizing module 314 (and/or the system to be described in FIG. 5 below) can make predictions of the types of additional technology resources and tools needed to complete the analytics and move into a production environment, based on the type of analytics being undertaken. As a result, the data scientist would be notified early if they needed to request additional tools that would enable them to complete their work. This aspect of system 300 enables the data scientist to initiate funding requests earlier in the DAL, identify people if specific skill sets are needed (such as a Hadoop™ expert in addition to a mathematician), and operationalize the resources before the data modeling stages (e.g., identify this during phase 404 of the DAL, rather than in phase 410) to avoid bottlenecks in the project.

It is further realized that a work package containing a larger sized data set will contribute to an increased cost, as provisioning will increase. Besides size, other data set characteristics may impact cost, e.g., perhaps publicly available data is cheaper than sensitive data, which requires an anonymization service. System 300 gives the data scientist insight into which data set characteristics would be most beneficial to the analytic plan.

Further, it is realized that the work of all data science projects are not equal. For example, a critical project such as one directed by an officer of the company (e.g., CEO) could require higher priority and take precedence over existing work packages. Also, perhaps the CEO's work package should be executed faster than regular data scientists, thus increasing provisioning. System 300 accounts for the priority levels associated with the data scientists.

Advantageously, system 300 allows a data scientist to know ahead of execution time the execution costs. Additionally, the system is able to dynamically change system parameters as the data scientist begins to refine the data and the analysis without having to start all over again or manually de-provision or increase the provisioned resources. System 300 creates a dynamic work package that includes the parameters needed to move through the analytics lifecycle and include the automation necessary to allow the data scientist to focus on fine tuning the parameters and not on manually changing the infrastructure or data ingest process.

II. Computing Resource Provisioning System

We now turn to a description of computing resource provisioning according to one or more illustrative embodiments of the invention. As mentioned above, computing resource provisioning may be implemented in the operationalizing module 314 or any other module in system 300 (and combinations thereof) described above in Section I. Also, computing resource provisioning may alternatively be implemented as a module separate from the modules of system 300 shown in FIG. 3, e.g., as a computing resource provisioning module that resides between system 300, receiving an intermediate or final work package 316, and providing computing resource provisioning techniques so as to yield a provisioned system 320. One illustrative example of such a computer resource provisioning system or module will be described below in the context of FIG. 5.

However, computing resource provisioning techniques as will be described herein can be implemented independent of and separate from system 300, and thus are not intended to be limited to any data analytics lifecycle automation and provisioning system described herein. That is, the techniques may be implemented in a standalone computing resource provisioning system or in some other computing system that can benefit from advantages of computing resource provisioning.

As explained above in the context of FIGS. 1-4, a data science experiment runs through a lifecycle which includes the creation of hypotheses, the collection of data into a sandbox, the exploration of the data, and the running of analytic models across that data. These steps require computing resources to be allocated. However, provisioning computing resources in an optimal fashion for any given project is often a difficult task when using conventional manual approaches, particularly when the computing resources are part of a cloud computing environment. Understanding the internal tiers of a cloud computing environment, their associated costs, and making the best choice for a given analytic job (depending on the budget of the data science project) is difficult to accomplish using manual techniques.

To overcome these and other drawbacks of conventional provisioning approaches, embodiments of the invention obtain output from one or more of the phases of a data analytics lifecycle (e.g., DAL 402 in FIG. 4) and import them into an algorithm configured, inter alia, to: (a) estimate the cost of (and time to) running the analytics on a given cloud infrastructure; and (b) proceed with the provisioning of the cloud to carry out the given data analytics experiment.

Accordingly, by way of example, a data scientist creates a set of hypotheses. These hypotheses are in textual form and can be associated with a specific algorithm(s) that is known from an ontology of useful algorithms in data science projects. It is assumed that the data scientist has also located candidate data sets within an enterprise that need to be analyzed, and is able to specify their current form (e.g., structured, unstructured) and location (e.g., database, file system). In addition, assume that the data sets have privacy considerations which are also specified (e.g., who can view/access the data). Given these inputs, a database administrator or a data engineer (e.g., usually someone, other than a data scientist, tasked with allocating the space and resources for the project) now wishes to allocate computing resources to run experiments. These resources are within a cloud environment that contains multiple tiers of service (e.g., memory sizes, connectivity and bandwidth options, storage tiers, etc.).

Embodiments of the invention provide an automated way for the data scientist (or associate) to map the algorithms and the data set characteristics onto the tiers and receive a set of configuration options for allocating and running data science experiments. Further, embodiments of the invention provide an automated way for the data scientist to understand the performance implications (e.g., how long will it take to run the models) on a specific cloud tier. Still further, embodiments of invention provide techniques for a cloud service provider to understand the characteristics of an analytic job and recommend appropriate tiers and/or capabilities and their associated costs. Also, embodiments of invention provide an automated way to actually provision the cloud resources and begin the experiment based solely on the hypotheses and data descriptions. With the use of conventional provisioning approaches, this often results in misconfiguration of cloud resources, budget overruns, and/or time wasted while re-configuring or testing a configuration. Embodiments of invention further provide an automated way to map the need for data privacy on certain data sets to the set of security services supported by the cloud infrastructure. Advantageously, embodiments of the invention enable data scientists to input the results of the initial phases of the analytic lifecycle into a workflow tool (process). The workflow process then interfaces with a given cloud environment, which has a known set of pooled resources, with associated usage costs for said resources.

Figure 5:
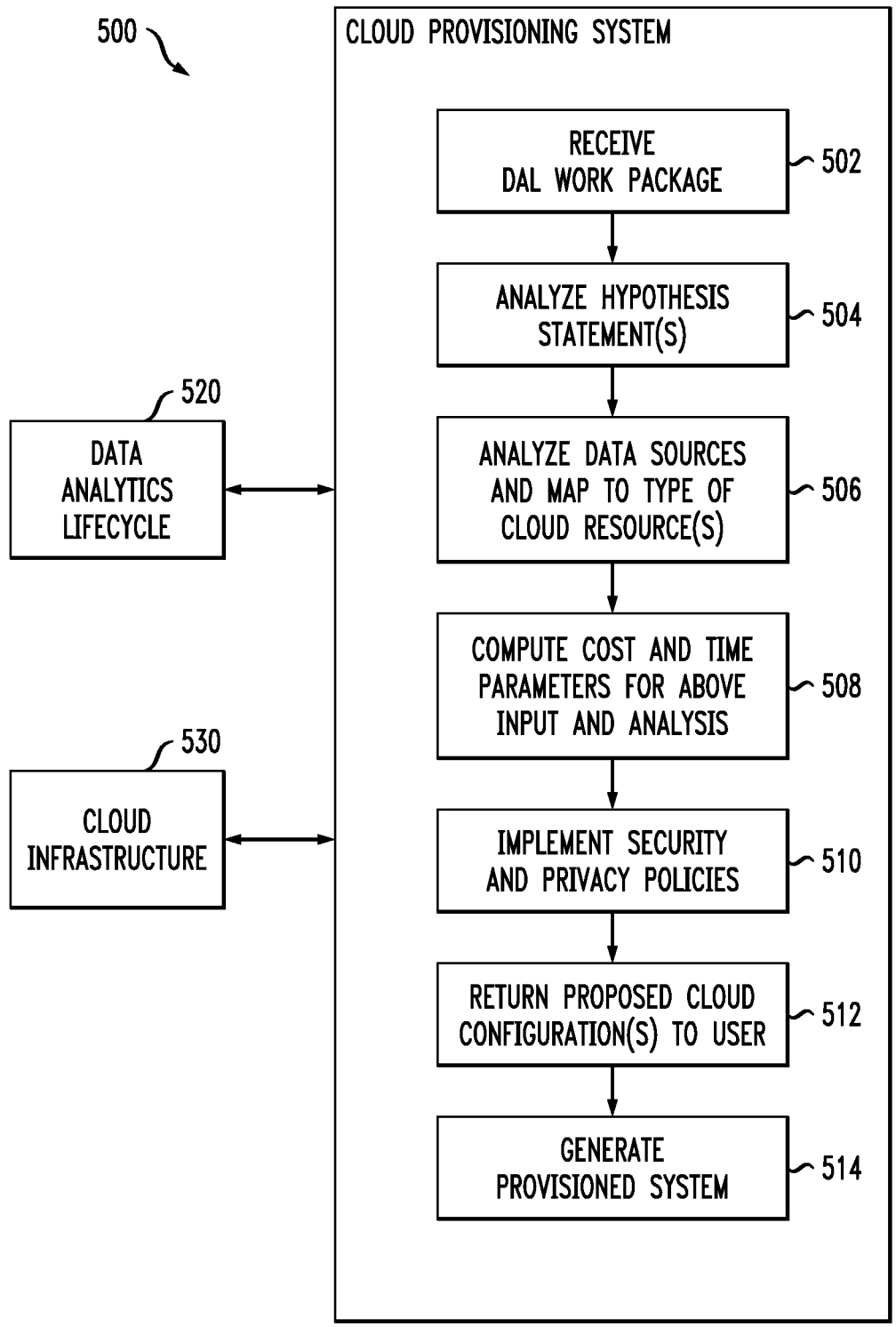
FIG. 5 illustrates a computing resource provisioning system and methodology, in accordance with one embodiment of the invention.

FIG. 5 illustrates a computing resource provisioning system and methodology, in accordance with one embodiment of the invention. In particular, cloud provisioning system 500 depicts a workflow process (steps 502 through 514) that accepts a description of the algorithms and data sets and privacy considerations that will be used in a given data modeling experiment. The system 500 (workflow process) maps these items to the available memory, network, storage, and security capabilities available within the cloud, recommends an optimal configuration with an approximate cost within a given timeframe, and presents this configuration to the user. In other embodiments, the system 500 is configured to offer a range or approximation of configuration parameters. In either case, the system improves cost transparency and reduces the level of uncertainty data scientists and other entity personnel have with the provisioning aspect of the data analytics effort.

The user (customer, data scientist, etc.) can analyze the output from a previous step and go through an iterative modification process in which cost is reduced or "time to complete" is accelerated (perhaps at a higher cost). This allows the user to go through what-if scenarios and get to an acceptable solution more quickly.

As the user explores and conditions data in the data preparation phase, the hypotheses may be altered and/or different analytic models chosen. These changes can be fed back into the workflow process to alter the provisioning of resources (e.g., less memory is desired, more flash storage is suggested, etc.).

Once a set of optimal cost and performance constraints are agreed upon, the user requests the cloud infrastructure to provision itself as the final step in the workflow process. Alternatively, a range of values can be set and simulations run until an optimized set of conditions is obtained with respect to cost, timing, capacity, privacy/security or even cloud providers. One example of a simulation that can be employed is a Markov Chain Monte Carlo (MCMC) which would be configured to create scenarios with the various constraints and offer optimal ones to the user. At this point, the user can decide whether to move forward and enable the cloud provisioning to begin. As an alternative, the user could choose to automate this portion of the process and set a default to provision a cloud environment based on the conditions derived from the MCMC simulation, which the user can customize if needed. Advantageously, throughout this workflow process, note that the user does not have to enter in specific provisioning requests (e.g., create a file system or database of size x, provision y GB of memory, etc.).

As illustratively shown in FIG. 5, the workflow process includes step 502 wherein the system 500 receives a work package (e.g., 316 in FIG. 3) from a data analytics lifecycle automation and provisioning system (e.g., 300 in FIG. 3).

In step 504, the workflow process analyzes hypothesis statements from the discovery phase (e.g., 404 in FIG. 4) of a data analytics lifecycle 520. In step 506, the workflow process analyzes data sources identified in the data preparation phase (e.g., 406 in FIG. 4) of the data analytics lifecycle 520. The workflow process then maps the data sources to the types of cloud resources available in the cloud infrastructure 530.

In step 508, the workflow process computes cost and timeframe parameters given the inputs and analysis results from steps 502, 504 and 506. In step 510, the workflow process implements security and privacy policies. One or more proposed cloud configurations are proposed to the user in step 512 (e.g., via the GUI 302 in FIG. 3). The optimal, or otherwise user-selected, configuration is then provisioned in step 514 to generate the provisioned system (e.g., 320 in FIG. 3).

It is to be appreciated that not only are data processing and/or data storage resources provisioned in accordance with computing resource provisioning embodiments of the invention, but also network resources. By way of example only, there may be bandwidth requirements for moving the data under analysis between storage and data processing resources, and this may involve the provisioning of a network (including resources of the network) to not only establish the path for the move but also configuring minimum/maximum bandwidth requirements.

The following are some illustrative non-limiting examples using computing resource provisioning techniques according to one or more embodiments of the invention. By way of example only, the workflow process in system 500 of FIG. 5 may be configured to operate consistent with these and other examples.

Example 1: Suggesting Memory Sizes/CPU Power for Specific Models

The system recommends a specific amount of memory, and a specific amount of CPU power, required for execution of a k-means algorithm on a specific size data set. The cost of using these specific resources is specified. A request for reduction in cost results in the recommendation of a server tier with less memory and weaker CPUs, thus lengthening the time to run the analysis.

Example 2: Suggesting Storage Capacity for Specific Models

The system recommends a specific amount of file system sandbox area that has a satisfactory bandwidth to ingest unstructured data into an analytic sandbox. A request for reduction in cost results in the recommendation of a NAS (network attached storage) tier with less powerful ingest capacities, thus lengthening the ELT process of the data into the sandbox.

Example 3: Security Fencing During Provisioning

Given an agreed upon specification of server load, storage, and network capacity, the user requests to provision the cloud for the model, and the system automatically creates secure accounts so only certain people can execute models, while other people are the only ones authorized to view the results.

Example 4: Cost Approximation of Cloud Compute Environments

After preparing the data and choosing a model, a business user needs to understand the budget constraints of a given project as part of an annual budgeting process. Enabling the optimization of constraints for cloud provisioning enables the user to understand a reasonable approximation of characteristics of the cloud environment needed (e.g., storage allocation, memory needed, etc.) and also the approximate cost involved for the specific use case. This enables the user to gauge how much funding to request for a given project or similar projects.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:

obtaining, via one or more processing elements associated with a computing system, a work package defining a data analytic plan for analyzing a given data set associated with a given data problem, the work package being generated based on an automated data analytics lifecycle, wherein the work package is associated with a priority level corresponding to a requester, and wherein the computing system is configured to dynamically change a set of parameters associated with the work package;

analyzing, via the one or more processing elements, the data analytic plan and the given data set;

mapping, via the one or more processing elements, one or more algorithms and one or more data set characteristics associated with the given data set onto one or more tiers of the computing system to generate one or more computing resource configuration options for implementing the data analytic plan;

computing, via the one or more processing elements, based on at least a portion of results of the analysis and the mapping, at least one of a cost parameter and a time parameter for each of the one or more computing resource configuration options, wherein the cost parameter comprises a computing power metric and the time parameter comprises a computing time metric;

restricting one or more operations of the one or more computing resource configuration options based on at least one security policy and at least one privacy policy, wherein the at least one security policy and the at least one privacy policy each specify one or more data access rules;

presenting, via the one or more processing elements, at least one of the cost parameter and the time parameter for each of the one or more computing resource configuration options;

selecting, via the one or more processing elements, one of the one or more computing resource configuration options based on at least one of the cost parameter and the time parameter, and the priority level of the work package; and provisioning, via the one or more processing elements, a computing resource infrastructure based on the selected computing resource configuration option.

2. The method of claim 1, wherein computing resources of the one or more computing resource configuration options comprise one or more network resources.

3. The method of claim 1, wherein computing resources of the one or more computing resource configuration options comprise one or more data storage resources.

4. The method of claim 1, wherein computing resources of the one or more computing resource configuration options comprise one or more data processing resources.

5. The method of claim 1, wherein the selecting step further comprises receiving input from a user to assist in selection of one of the one or more computing resource configuration options.

6. The method of claim 1, wherein the selecting step further comprises receiving input from an optimization program to assist in selection of one of the one or more computing resource configuration options.

7. The method of claim 1, wherein the computing resource infrastructure being provisioned based on the selected computing resource configuration option comprises at least one of virtualized resources and physical resources.

8. The method of claim 1, wherein the work package comprises a set of instructions for performing one or more phases of the data analytic lifecycle.

9. The method of claim 8, wherein the one or more phases comprise one or more of a discovery phase, a data preparation phase, a model planning phase, a model building phase, and an operationalizing phase.

10. The method of claim 8, further comprising importing one or more outputs of the one or more phases of the data analytic lifecycle into one or more algorithms, wherein at least one of computing the cost parameter and the time parameter and provisioning the computing resource infrastructure is performed utilizing the one or more algorithms.

11. A computer program product comprising a non-transitory processor-readable storage medium having encoded therein executable code of one or more software programs, wherein the one or more software programs when executed by one or more processing elements of a computing system implement the steps of:

obtaining a work package defining a data analytic plan for analyzing a given data set associated with a given data problem, the work package being generated based on an automated data analytics lifecycle, wherein the work package is associated with a priority level corresponding to a requester, and wherein the computing system is configured to dynamically change a set of parameters associated with the work package;

analyzing the data analytic plan and the given data set;

mapping one or more algorithms and one or more data set characteristics associated with the given data set onto one or more tiers of the computing system to generate one or more computing resource configuration options for implementing the data analytic plan;

computing, based on at least a portion of results of the analysis and the mapping, at least one of a cost parameter and a time parameter for each of the one or more computing resource configuration options, wherein the cost parameter comprises a computing power metric and the time parameter comprises a computing time metric;

restricting one or more operations of the one or more computing resource configuration options based on at least one security policy and at least one privacy policy, wherein the at least one security policy and the at least one privacy policy each specify one or more data access rules;

presenting at least one of the cost parameter and the time parameter for each of the one or more computing resource configuration options;

selecting one of the one or more computing resource configuration options based on at least one of the cost parameter and the time parameter, and the priority level of the work package; and provisioning a computing resource infrastructure based on the selected computing resource configuration option.

12. An apparatus comprising:

a memory; and at least one processor operatively coupled to the memory and configured to:

obtain a work package defining a data analytic plan for analyzing a given data set associated with a given data problem, the work package being generated based on an automated data analytics lifecycle, wherein the work package is associated with a priority level corresponding to a requester, and wherein the computing system is configured to dynamically change a set of parameters associated with the work package;

analyze the data analytic plan and the given data set;

map one or more algorithms and one or more data set characteristics associated with the given data set onto one or more tiers of the computing system to generate one or more computing resource configuration options for implementing the data analytic plan;

compute, based on at least a portion of results of the analysis and the mapping, at least one of a cost parameter and a time parameter for each of the one or more computing resource configuration options, wherein the cost parameter comprises a computing power metric and the time parameter comprises a computing time metric;

restrict one or more operations of the one or more computing resource configuration options based on at least one security policy and at least one privacy policy, wherein the at least one security policy and the at least one privacy policy each specify one or more data access rules;

present at least one of the cost parameter and the time parameter for each of the one or more computing resource configuration options;

select one of the one or more computing resource configuration options based on at least one of the cost parameter and the time parameter, and the priority level of the work package; and provision a computing resource infrastructure based on the selected computing resource configuration option.

13. The apparatus of claim 12, wherein computing resources of the one or more computing resource configuration options comprise one or more network resources.

14. The apparatus of claim 12, wherein computing resources of the one or more computing resource configuration options comprise at least one of one or more data storage resources and one or more data processing resources.

15. The apparatus of claim 12, wherein the selection performed by the at least one processor further comprises receiving input from a user to assist in selection of one of the one or more computing resource configuration options.

16. The apparatus of claim 12, wherein the selection performed by the at least one processor further comprises receiving input from an optimization program to assist in selection of one of the one or more computing resource configuration options.

17. The apparatus of claim 12, wherein the computing resource infrastructure being provisioned based on the selected computing resource configuration option comprises at least one of virtualized resources and physical resources.

18. The apparatus of claim 12, wherein the work package comprises a set of instructions for performing one or more phases of the data analytic lifecycle.

19. The apparatus of claim 18, wherein the one or more phases comprise one or more of a discovery phase, a data preparation phase, a model planning phase, a model building phase, and an operationalizing phase.

20. The apparatus of claim 18, wherein the at least one processor is further configured to import one or more outputs of the one or more phases of the data analytic lifecycle into one or more algorithms, wherein at least one of the computation of the cost parameter and the time parameter and the provisioning of the computing resource infrastructure is performed utilizing the one or more algorithms.

* * * * *